Jan. 8, 1929.	W. N. BOOTH	1,698,082
VEHICLE WHEEL
Filed May 29, 1922
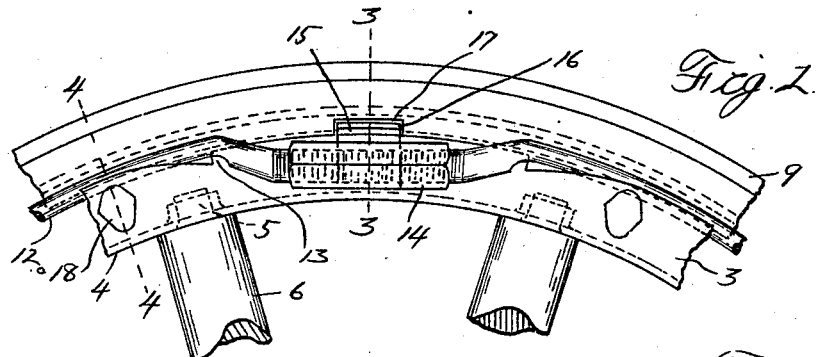
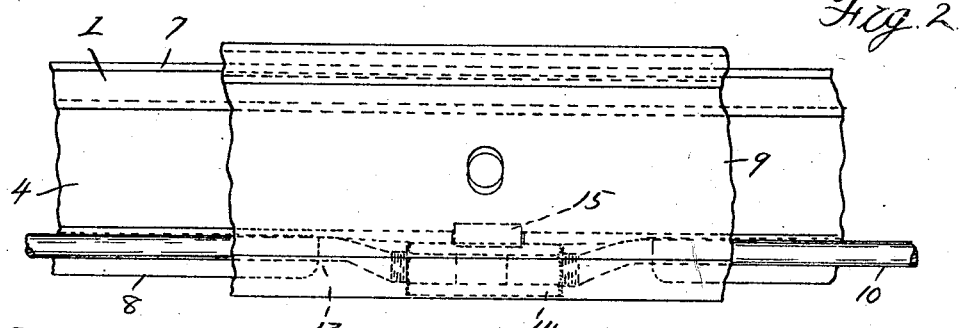
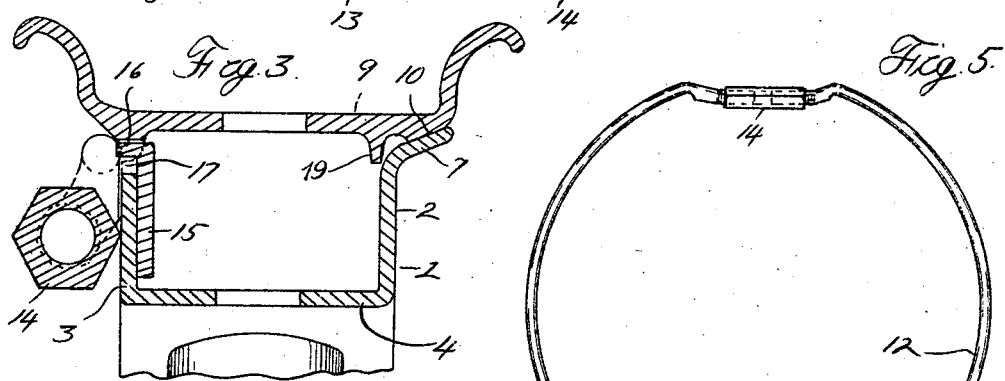
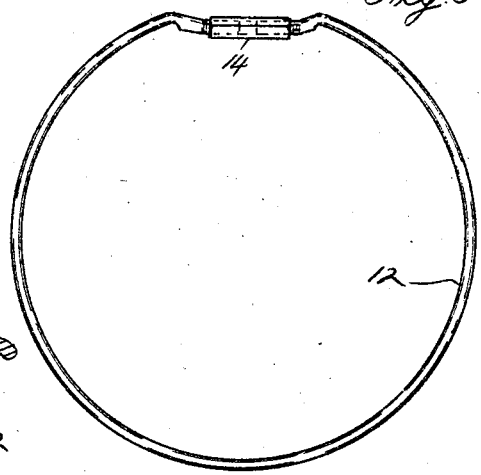
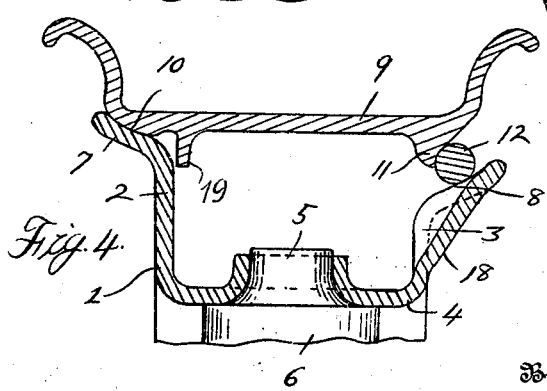
Inventor
William N. Booth Patented Jan. 8, 1929.

1,698,082

UNITED STATES PATENT OFFICE.

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK.

VEHICLE WHEEL.

Application filed May 29, 1922. Serial No. 564,388.

The invention relates to vehicle wheels and refers particularly to the construction of the permanent rim and associated parts for securing a demountable rim in place. The invention has for one of its objects the provision of a permanent rim upon which a demountable rim is seated and with which a transversely split retaining ring has a wedging engagement. Another object is to provide a simple form of driving device upon the permanent rim for the demountable rim. A further object is to provide means upon the demountable rim engageable with the permanent rim for guiding the demountable rim to its seat upon the permanent rim.

With these as well as other objects in view, the invention resides in the novel features of construction and combinations and arrangements of parts as more fully hereinafter set forth.

In the drawings:

Figure 1 is a side elevation of a portion of a vehicle wheel embodying my invention;

Figure 2 is a plan view thereof;

Figures 3 and 4 are cross sections on the lines 3—3 and 4—4 of Figure 1;

Figure 5 is a side elevation of the retaining ring.

1 is the metallic felly or permanent rim of the wheel having the inner and outer side flanges 2 and 3 respectively and the base 4 which is engaged in by the tenons 5 of the spokes 6. The side flanges 2 and 3 have the outwardly flaring bearing portions 7 and 8 respectively, the bearing portion 7 being radially beyond the bearing portion 8. 9 is the demountable rim having the flaring bearing portion 10 for engaging the inner bearing portion 7 of the permanent rim and also having the inwardly extending annular bead 11 at the side opposite to the bearing portion 10, this bead having a sufficiently large diameter to clear the outer side flange 3.

To force the demountable rim laterally inward upon its seat upon the inner side flange 2 of the permanent rim, I have provided the transversely split retaining ring 12 which is engageable with the outer side of the annular bead 11 upon the demountable rim and with the flaring bearing portion 8 upon the outer side flange 3 of the permanent rim. The outer face of the bead 11 is substantially parallel to the plane of rotation of the wheel so that the lateral inward movement of the retaining ring upon the permanent rim exerts a lateral pressure upon the demountable rim through the bead. To contract and expand the retaining ring and thereby secure its lateral inward movement or permit of its lateral outward movement, the bearing portion 8 of the permanent rim is interrupted at 13, to permit of the outward lateral bending of the ends of the retaining ring as well as the radial inward ending so that they extend adjacent to the outer side of the main part of the outer side flange 3. These ends are respectively right and left hand threaded and are engaged by the hexagonal coupling 14, rotation of which in one direction moves the ends toward each other to contract the retaining ring and move the same laterally inward owing to its wedging action with the permanent rim. Rotation of the coupling in the opposite direction moves the ends of the retaining ring away from each other and permits of the expansion of the ring and its outward lateral movement off the permanent rim.

To drive the demountable rim from the permanent rim, I have provided the driving plate 15 fixedly secured to the inner side of the outer side flange 3 and having the transverse outwardly extending flange 16 which engages in the recess 17 in the annular bead 11.

For the purpose of guiding the demountable rim to its seat upon the outwardly flaring bearing portion 7 upon the inner side flange 2 of the permanent rim, the demountable rim has the inwardly extending annular flange or bead 19 which is normally slightly spaced from the inner side flange 2 of the permanent rim, but is adapted to engage the same in the event that the demountable rim is being assembled upon the permanent rim in a plane non-parallel thereto.

To reinforce the metallic felly or permanent rim at the point where its outer side flange 2 is cut away or interrupted, I have provided the outwardly embossed portions 18 in the outer side flange to stiffen the same.

What I claim as my invention is:

1. In a vehicle wheel, the combination with a permanent rim having an interrupted flaring bearing portion, of a demountable rim seated upon said permanent rim and provided with an inwardly extending bead, a transversely split retaining ring upon said bearing portion and engaging said demountable rim, means at the interruption in said bearing portion for moving the ends of said retaining ring toward and away from each other, and a driving plate secured to said permanent rim at the interruption in said bearing portion and engaging the inwardly extending bead upon said demountable rim to drive the latter from the former.

2. In a vehicle wheel, the combination with a permanent rim having a side flange provided with an interrupted flaring bearing portion, of a demountable rim seated upon said permanent rim and provided with an inwardly extending bead having a recess therein, a transversely split retaining ring upon said bearing portion and engaging said demountable rim, means at the interruption in said bearing portion for moving the ends of said retaining ring toward and away from each other, and means upon said side flange at the interruption in said bearing portion and engaging in the recess in said bead for driving said demountable rim from said permanent rim.

3. In a vehicle wheel, the combination with a permanent rim, of a demountable rim seated upon said permanent rim and provided with an inwardly extending bead, means for retaining said demountable rim upon said permanent rim and means upon said permanent rim and engaging the bead of said demountable rim for driving the latter from the former.

4. In a vehicle wheel, the combination with a permanent rim having a side flange, of a demountable rim seated upon said permanent rim and provided with an inwardly extending bead having a recess therein, means for retaining said demountable rim upon said permanent rim, and a plate upon said side flange and engaging in the recess in said bead for driving said demountable rim from said permanent rim.

5. In a vehicle wheel, the combination with a permanent rim having side flanges provided with bearing portions, one of said bearing portions being interrupted, of a demountable rim seated upon the other of said bearing portions, a transversely split retaining ring engaging said demountable rim and interrupted bearing portion, means engaging the ends of said ring at the interruption in said bearing portion for contracting the ring, and means fixedly secured to the inner side of one of the flanges on said permanent rim at the interruption in said bearing portion and engaging said demountable rim for driving the latter from the former.

6. In a vehicle wheel, the combination with a permanent rim having inner and outer side flanges, of a demountable rim adapted to seat upon one of said flanges having inwardly extending annular projections adjacent the inner and outer sides thereof, one of said projections engageable with the outer side of said inner flange to guide the demountable rim to its seat upon the rim, and means connected to said permanent rim and engaging the other of said projections on said demountable rim for driving the latter from the former.

7. In a vehicle wheel, the combination with a permanent rim having inner and outer side flanges, of a demountable rim adapted to seat upon one of said flanges having inwardly extending annular projections adjacent the inner and outer sides thereof, the inner projection being so positioned as to engage the inner flange to guide the demountable rim to its seat upon the rim, the other of said projections having a recess therein, and a plate upon said outer flange having a portion engaging in the recess in said outer projection for driving the demountable rim from said permanent rim.

In testimony whereof I affix my signature.

WILLIAM N. BOOTH.